(12) United States Patent
Sanchez

(10) Patent No.: US 7,544,889 B1
(45) Date of Patent: Jun. 9, 2009

(54) ADJUSTABLE BRACKET FOR OUTLET AND SWITCH BOXES

(76) Inventor: Angel Castillo Sanchez, 727 W. Madison St., Milwaukee, WI (US) 53204

( * ) Notice: Subject to any disclaimer, the term of this patent is extended or adjusted under 35 U.S.C. 154(b) by 0 days.

(21) Appl. No.: 11/455,349

(22) Filed: Jun. 19, 2006

Related U.S. Application Data

(60) Provisional application No. 60/691,936, filed on Jun. 17, 2005.

(51) Int. Cl.
*H01H 9/02* (2006.01)
(52) U.S. Cl. .............................. 174/58; 174/57; 174/53; 220/3.2; 220/3.7; 248/906
(58) Field of Classification Search .................. 174/58, 174/57, 50, 53, 480, 481, 503, 54, 63, 62; 220/3.2–3.9, 4.02; 248/906, 27.3, 27.1, 225.11; 439/535, 538; D13/152
See application file for complete search history.

(56) References Cited

U.S. PATENT DOCUMENTS

| | | | |
|---|---|---|---|
| 1,519,735 A | 12/1924 | Kruse | |
| 2,031,689 A | 2/1936 | Buckels | |
| 3,365,156 A | 1/1968 | Beck | |
| 3,720,395 A | 3/1973 | Schuplin | |
| 3,730,466 A | 5/1973 | Swanquist | |
| 3,834,658 A | 9/1974 | Theodorides | |
| 4,062,470 A | 12/1977 | Boteler | |
| 4,140,293 A | 2/1979 | Hansen | |
| 4,214,668 A | 7/1980 | Neff et al. | |
| 4,447,030 A | 5/1984 | Nattel | |
| 4,747,506 A | 5/1988 | Stuchlik, III | |
| 4,971,280 A | 11/1990 | Rinderer | |
| 5,004,199 A | 4/1991 | Suk | |
| 5,253,831 A | 10/1993 | Theodorides | |
| 5,289,934 A | 3/1994 | Smith et al. | |
| 5,408,045 A | 4/1995 | Jorgensen et al. | |
| 5,810,303 A | 9/1998 | Bourassa et al. | |
| 5,841,068 A | 11/1998 | Umstead et al. | |
| 6,389,658 B1 | 5/2002 | Pfaller et al. | |
| 6,956,172 B2 | 10/2005 | Dinh | |
| 7,073,757 B2 * | 7/2006 | Johnson et al. | 248/906 |
| 7,087,837 B1 * | 8/2006 | Gretz | 174/58 |
| 7,112,743 B2 * | 9/2006 | Hull et al. | 174/58 |

* cited by examiner

*Primary Examiner*—Angel R Estrada

(57) ABSTRACT

An adjustable outlet box assembly provides for attachment of an outlet box to a wall stud. The assembly includes an outlet box and a box bracket which is adjustably positioned to the outlet box. The box includes a flange which attaches to a linear set of teeth on the box bracket for resilient engagement with the side wall of the box. The bracket includes a stud attachment portion got engagement with the stud. The bracket is adjustably positioned on the box so that the box may be positioned with respect to the wall stud.

2 Claims, 5 Drawing Sheets

ADJUSTABLE BRACKET FOR OUTLET AND SWITCH BOXES

CROSS-REFERENCE TO RELATED APPLICATIONS

This application claims the benefit of provisional patent application Ser. No. 60/691,936, filed 2005 Jun. 17 by the present inventor.

FEDERALLY SPONSORED RESEARCH

Not Applicable

SEQUENCE LISTING OR PROGRAM

Not Applicable

BACKGROUND OF THE INVENTION

1. Field of the Invention

This invention relates to adjustable brackets, specifically to such brackets which are used for installing electrical outlet and switch boxes. More particularly, the present invention relates to an outlet box assembly which permits the adjustable positioning of an outlet box with respect to the stud.

2. Prior Art

Electrical outlet boxes are used in residential and commercial construction to house wire termination devices such as electrical switches and receptacles. The box encloses the termination of the wires to the termination devices. Electrical outlet boxes are secured to wall studs which are covered with wall board or other such wall material. The outlet boxes are secured to wall studs which are covered with wall board or other wall material. The outlet box is positioned such that the open front face of the outlet box lies flush with respect to the surface of the wall board placed over the stud.

Due to variations in the thickness of commercially available wall board, it is often necessary to adjust the position of the box once it is installed on the stud to assure that the open front face of the box lies flush with the wall board. Various securement techniques have been developed to adjustably position the box with respect to the stud so as to accommodate variations in wall board thickness.

U.S. Pat. No. 5,253,831 shows a bracket attached to a stud which allows discrete positioning of the outlet box with respect to the face of the wall board mounted there over.

U.S. Pat. No. 4,747,506 shows and adjustable box mounting assembly where a multi-component bracket allows the slid able positioning of the box.

Each of U.S. Pat. Nos. 3,834,658 and 5,289,934 shows a technique for adjustably mounting an outlet box to a stud where the adjustability is provided by way of screw adjustment.

U.S. Pat. No. 4,971,280 employs a multi-component clip for adjustably positioning an outlet box with respect to a wall stud.

U.S. Pat. No. 6,956,172 show a technique with a box bracket including a box attachment portion having a deflectable finger for adjusting the outlet box to a stud. This technique requires a screwdriver to deflect the finger from engaging with the wall of the outlet box to adjust the box into place.

While each of these devices provide for the adequate adjustment of the outlet box with respect to the wall stud to assure that the open front face of the box lies flush with the wall board applied there over, most of them are very cumbersome to assemble and use in the field and none of them provide a removable box to easily correct miss installed boxes or for the need for change over time. Another feature that is totally unique is the ability to slide the box into the wall without the need to insert a device to either adjust a screw or deflect an engagement member. The invention allows the easy installation of an outlet box that will simply slide into the wall to sit flush with the outlet box cover. While servicing most installations electricians use many different tools to fix miss installed boxes. The removability of the box with the ease of simply releasing the tongue allows the box to easily be moved and even removed completely out of the wall. The box allows for an easy transition from a single box to a double, triple or whatever is needed to make adjustments for our ever changing lives.

It is, therefore, desirable to provide a simple unique adjustable outlet box assembly which allows adjustable positioning of the open front face of an outlet box with respect to the wall stud, is easy to assemble and use, and can be removed with ease.

OBJECTS AND ADVANTAGES

Accordingly, several objects and advantages of the invention are the complete removability of the outlet box, along with the ability to adjust the outlet box so that the front of the box will be flush with respect to the subsequently applied dry wall or paneling. The outlet box has many advantages, it allows for repairs to be made faster when the removability of the outlet box is needed. There are many reasons why this may be necessary. For example, in our ever changing world it is often necessary to change a single box to a double, triple or even a quadruple box to add a telephone jack, a phone line or another outlet or switch box. While each of the previous devices provides an adequate method for adjusting an outlet box, none of them provide the ability to completely remove the box and to adjust as easily as the present invention.

Further objects and advantages will become apparent from a consideration of the ensuing description and drawings.

SUMMARY

In accordance with the invention, it provides an adjustable outlet box assembly for attachment to a wall stud with complete removability when necessary. The assembly includes an outlet box having a side wall and an open front face. An integrally formed box bracket includes a stud attachment portion for fixing the bracket to the wall stud. The bracket also includes a side wall attachment portion for slidable attachment to the side wall of the outlet box. The side wall attachment portion includes an engagement member in a biased position that engages with the side wall attachment portion of the bracket with respect to the side wall of the box. The side wall attachment portion of the bracket contains a linear set of teeth horizontally parallel to the bracket that engage with the engagement member or flange on the receptacle box. The outlet box can be perfectly adjusted by putting the outlet cover over the front face of the box and pushing it into the wall till the front face is flush with the drywall for a perfect installation every time. The bracket has an electrical box stop bump to prevent the box from traveling to far into the wall. If the box needs to be removed or adjusted towards the front face it can be pulled out or removed by using a tool such as a screw driver to release the engagement member or flange by pressing it against the side wall of the box.

The present invention could also be used in any other instance where a removable part is necessary; it is not exclusive to an electrical outlet box.

DRAWINGS—FIGURES

Figure 1:
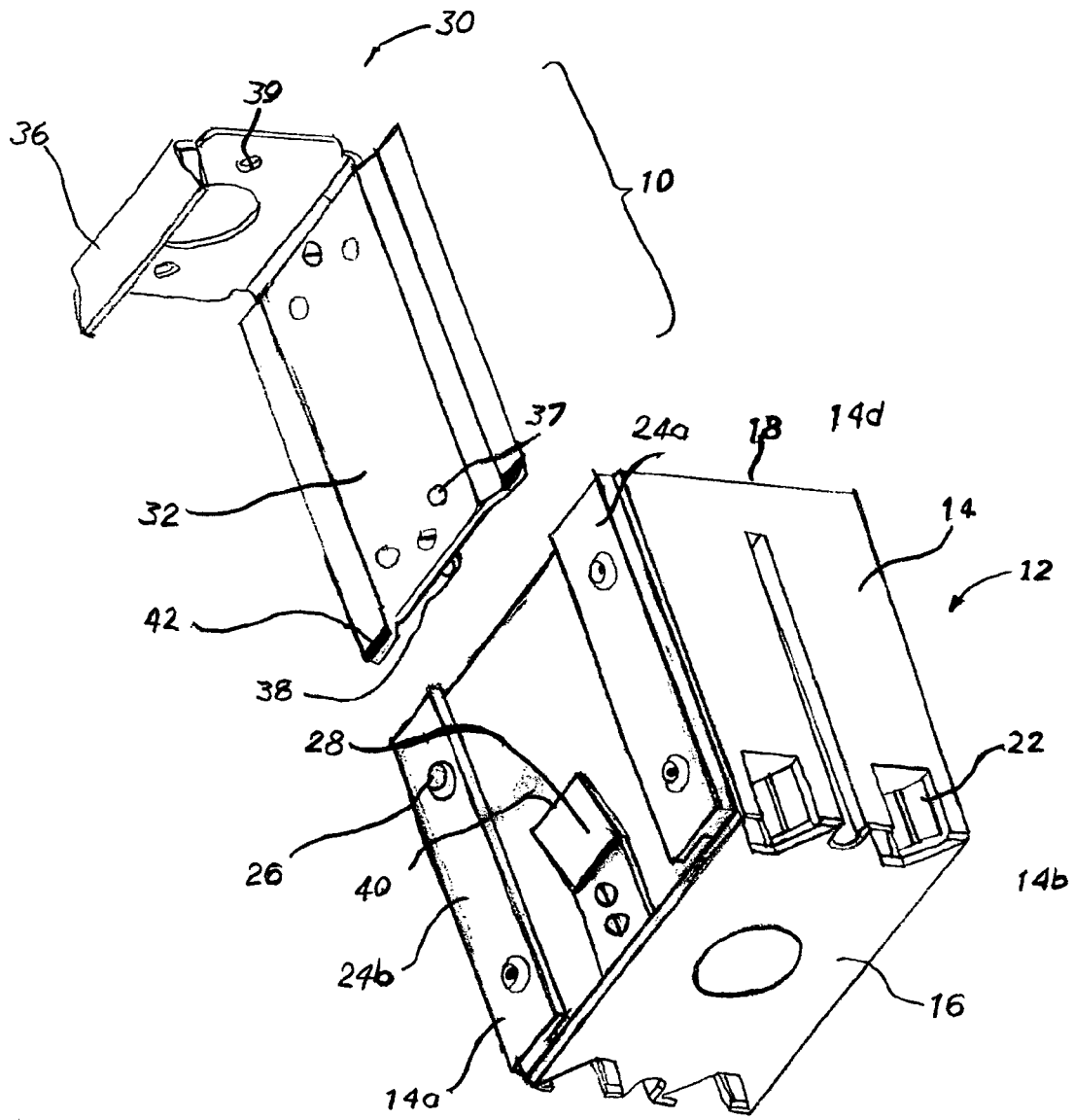
FIG. 1 is a side perspective view of the components of the outlet box assembly of the present invention.

REFERENCE NUMERALS 10 outlet box attachment assembly
12 electrical outlet box
14 outlet box perimetrical side wall
15 stud
16 outlet box back wall
18 outlet box open front face
20 outlet box interior
22 outlet box wire entry openings
24 retaining rails
26 screws to attach retaining rail to outlet box
28 engagement member or flange
30 box bracket
32 longitudinal sidewall attachment member
34 transverse stud attachment member
36 distal depending portion
37 plural inwardly directed dimples
38 linear set of teeth
39 mounting apertures
40 distal tip of the flange
42 electrical box stop bumps
50 screwdriver blade
52 screwdriver

DETAILED DESCRIPTION

Preferred Embodiment

Figure 2:
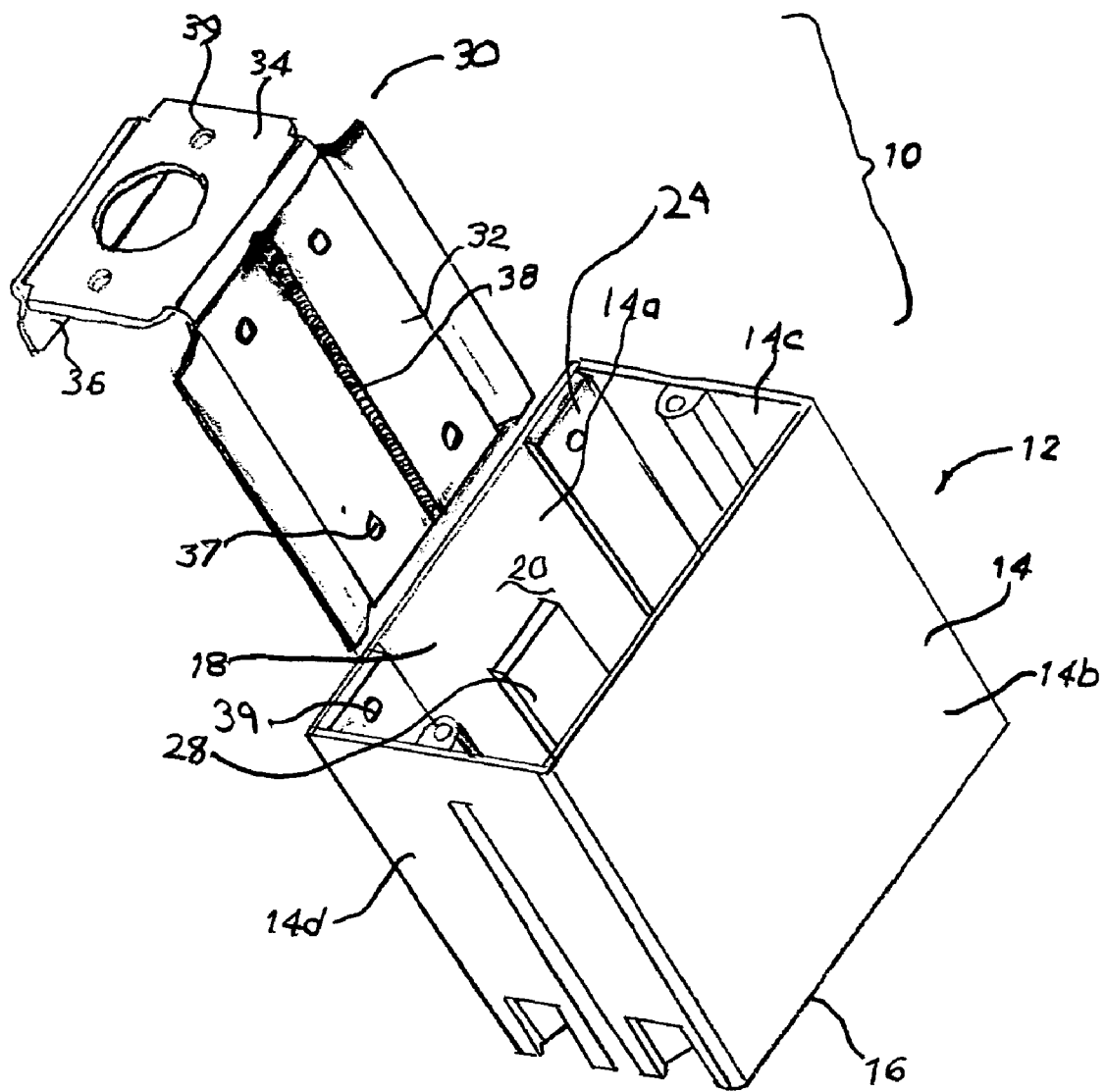
FIG. 2 is the other side perspective view (opposite FIG. 1) of the components of the outlet box assembly of the present invention.

Referring now to FIGS. 1 and 2, the outlet box attachment assembly 10 of the present invention is shown. Assembly 10 includes an electrical outlet box 12 of generally conventional construction. In the present illustrative embodiment outlet box 12 is a single-gang non-metallic box used to house electrical termination connectors such as receptacles and switches (not shown), in conventional fashion. While a non-metallic single-gang box is shown by way of preferred embodiment, it may be appreciated that the present invention may be operable with multi-gang boxes and with boxes of metallic or other type of material construction.

Outlet box 12 is generally a rectangular member having a parametrical side wall 14 upstanding from a back wall 16. Opposed to back wall 16 is an open front face 18. Open front face 18 allows accessible entry into the box interior 20 which supports termination of electrical wires (not shown) to electrical termination components. As shown particularly in FIG. 1, the back wall 16 and side wall 14 may include wire entry openings 22 to permit insertion of wires into the interior 20 of box 12. Side wall 14 being perimetrical, includes a pair of lateral wall 14a and 14b as well as top and bottom walls 14c and 14d. Lateral wall 14a includes two retaining rails 24a and 24b attached to the outlet box with two screws 26a. Retaining rail 24a extends between the open front face 18 and the back wall 16 on the upper most portion of lateral wall 14a where it joins the top lateral wall 14c. Retaining rail 24b extends between the open front face 18 and the back wall 16 on the lower most portion of lateral wall 14a where it joins the bottom lateral wall 14d. While a metallic retaining rails 24a and 24b is shown by way of preferred embodiment, it may be appreciated that the present invention may be constructed with the retaining rails 24a and 24b being formed as part of outlet box 12 when it is constructed. The lateral wall 14a also contains an engagement member or flange 28 centrally located at the open front face 18. The flange 28 is in an upward biased position with the biased position facing the back wall 16. The flange 28 is connected to lateral wall 14b with two screws 26b. While a metallic flange 28 is shown by way of preferred embodiment, it may be appreciated that the present invention may be constructed with the engagement member 28 being constructed out of other materials such as plastic. The retaining rails 24a and 24b and the flange 28 will be discussed in further detail herein bellow.

Outlet box attachment assembly 10 further includes and integrally formed box bracket 30. As shown in the drawing box bracket 30 is generally a hook-shaped member formed of steel and is designed for positioning along retaining rails 24a and 24b of side wall 14a of box 12 while a hook shape as shown bracket 30 can be other shapes such as L-shaped. Box bracket 30 includes a longitudinal sidewall attachment member 32 which is generally planer in configuration. Longitudinal member 32 includes at on distal end thereof an integrally formed transverse stud attachment member 34 extending therefrom at approximately a right angle.

Transverse member 34 which is also generally planar extends from longitudinal member 32 and may include a distal depending portion 36 extending generally parallel to longitudinal member 32 thereby forming the hook shape. Traverse member 34 has an extent which is generally coextensive with the face 15a of a stud 15 (FIG. 5) to which it is mounted so that box bracket 30 can be attached to the stud with the transverse portion 34 lying flush with the face 15a of a stud 15. The traverse portion 34 further includes a pair of mounting apertures 39 to allow insertion of a fastening member such as a screw or nail to permanently secure the box bracket 30 to the face 15a of the stud. While a simple hook shape is formed by the traverse portion 34 and the distal depending portion 36 as the preferred embodiment of this invention, it may be appreciated that the present invention may be constructed in different ways to attach to the flush face 15a of the stud 15. Such as, having a central barb to bite engagement on the distal depending portion 36 along with mounting apertures 39 on traverse portion 34 to further attach the box bracket to the stud, or a simple traverse portion 34 with mounting apertures 39 excluding the distal depending portion 36.

To facilitate the mounting of bracket to the stud 15, longitudinal member 32 includes plural inwardly directed dimples 37 which facilitate attachment to the side 15c of the stud 15 with screws or nails.

OPERATION

Preferred Embodiment

Figure 3:
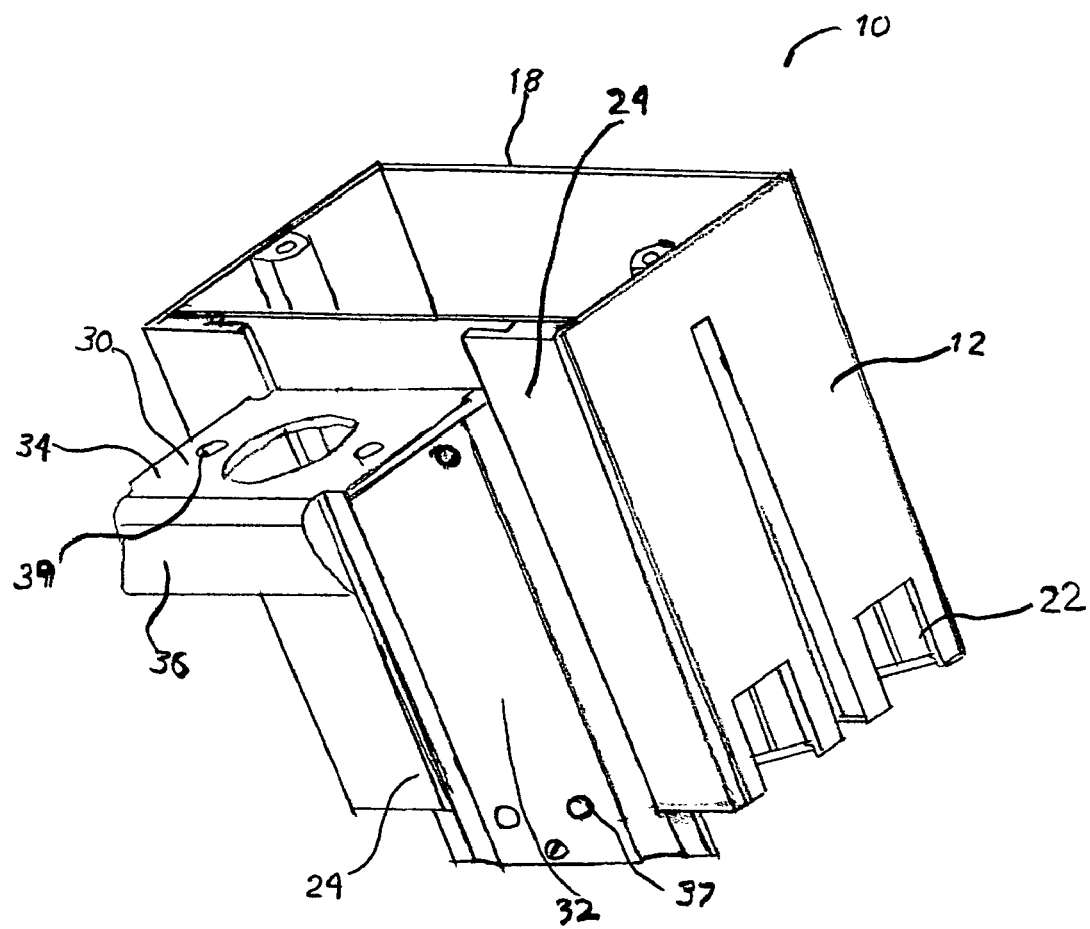
FIGS. 3 and 4 are perspective showings of the assembled outlet box assembly of FIGS. 1 and 2.
Figure 4:
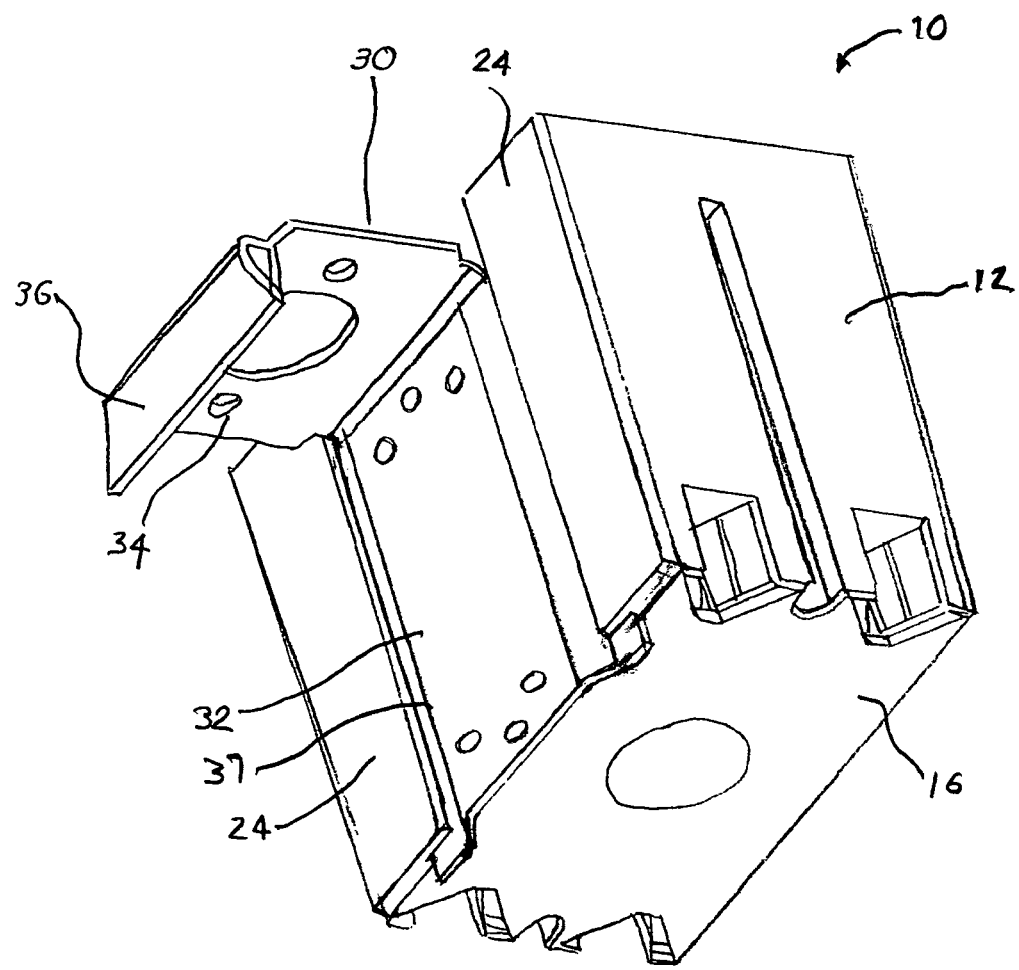

As shown in FIGS. 3 and 4, box bracket 30 is slidably positioned along the lateral wall 14a of outlet box 12 being received within the retaining rails 24a and 24b. The retaining rails 24a and 24b attached to the lateral wall 14a of the outlet box 12 with two screws 26a. Retaining rail 24a extends between the open front face 18 and the back wall 16 on the upper most portion of lateral wall 14a where it joins the top lateral wall 14c. Retaining rail 24b extends between the open front face 18 and the back wall 16 on the lower most portion of lateral wall 14a where if joins the bottom lateral wall 14d. The pair of retaining rails 24a and 24b provides a retaining track to support the longitudinal member 32 of bracket 30 to the outlet box 12. In the position shown in FIGS. 3 and 4, the bracket 30 is slidably moveable with respect to the side wall 14 of outlet box 12.

In order to fix the position of bracket 30 in respect to outlet box 12, bracket 30 on the side wall 32 contains a linear set of teeth 38 which are horizontally parallel to the bracket 30. In the present illustrative embodiment the linear set of teeth 38 are spaced at $1/16^{th}$ of an inch a part, it may be appreciated that the present invention may be operable with the linear set of teeth 38 spaced at any such distance depending on the accuracy needed for adjustment on any particular outlet box 12. Lateral wall 14 of outlet box 12 contains an engagement member or flange 28 which is centrally located at the open front face 18. The flange 28 is in an upward biased position with the biased position facing the back wall 16. The flange 28 is connected to lateral wall 14b with two screws 26b. To fix the position of bracket 30 in respect to outlet box 12, the flange 28 is biasingly directed toward the linear set of teeth 38 so that the distal tip 40 of the flange 28 is positioned to engage with the linear set of teeth 38 on the bracket 30. The distal tip 40 of the flange 28 bites into the linear set of teeth 38 to secure the bracket at a desired position therealong.

The bracket 30 also contains an electrical box stop bumps 42a and 42b which are located on the bracket face 30a on the opposite side from the traverse member 32. The electrical box stop bumps 42a and 42b stop the outlet box 12 from traveling along the bracket 30 to far into the wall. Without the electrical box stop bumps 42a and 42b it would be likely that the electrical box 12 could fall off the bracket 30 and fall into the wall.

Figure 5:
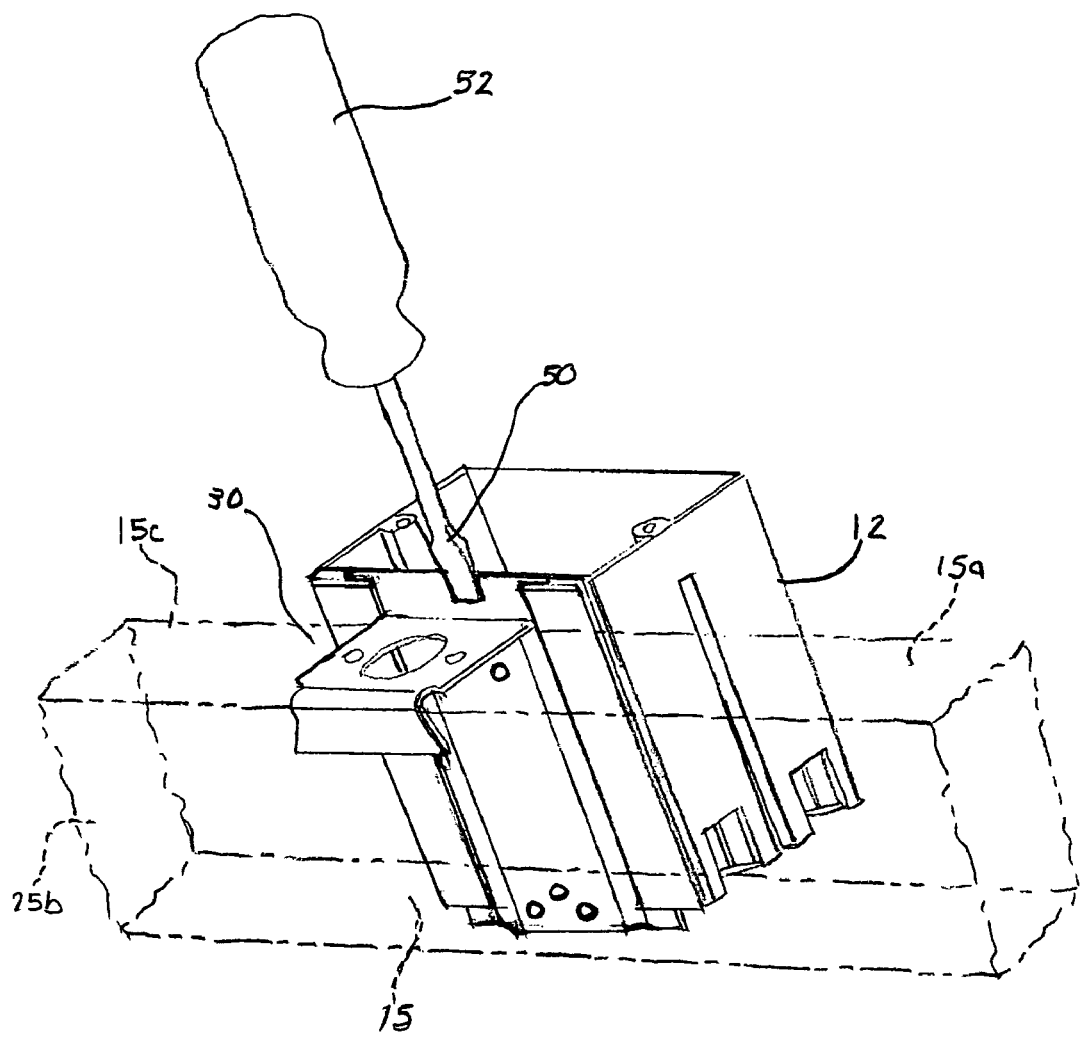
FIG. 5 is a perspective showing of the outlet box assembly of FIG. 1 attached to a wall stud shown in phantom.

Movement of the bracket 30 with respect to the outlet box 12 is achieved by deflecting the flange 28 out from engagement with the linear set of teeth 38 of bracket 30 so that the bracket may be moved with respect to the side wall 14a of the outlet box 12. As shown in FIG. 5, a blade 50 of a screwdriver 52 may be inserted between the side wall 14a of the box 12 and the box bracket 30 to manually deflect the flange 28 out from biting engagement with the linear set of teeth 38. This allows the box 12 to be moved along the longitudinal portion 32 of the box bracket 30 to a desired position with respect to the stud 15, or complete removal of the outlet box 12 when desired. The open front face 18 of the box 12 is properly positioned with respect to the stud 15 by pushing the box 12 into the wall until it is flush with the drywall or other wall materials (not shown).

Thus, the present invention provides for the adjustable positioning of the open front face 18 of the outlet box 12 with respect to the stud with an integrally formed box bracket 30 requiring no assembly of components or mechanical mechanism for achieving such adjustment. The installer slides outlet box 12 into bracket 30 and the flange 28 engages with the linear set of teeth 38 adjusting $1/16^{th}$ of an inch further into the wall with each tooth of the linear set of teeth 38 that the flange 28 is pushed over until the box is flush with the drywall allowing for a perfect installation every time. The electrical box stop bumps 42a and 42b prevent the electrical box 12 from traveling off of the bracket 30 and falling into the wall. There is no need for any tools such as the screwdriver 52 in FIG. 5 unless the box 12 is pushed to far into the wall and needs to be adjusted as explained above or the complete removal of the box 12 is desired to replace the box 12 with a different receptacle or for repairs.

CONCLUSION, RAMIFICATIONS, AND SCOPE

Accordingly the reader will see that, the invention I have provided has an easily adjustable outlet box bracket assembly that allows for the complete removability of the outlet box when necessary. It keeps the box from being pushed to deeply into the wall by having an electrical stop bump which will save the installer a lot of time and frustration that other outlet boxes do not anticipate. The invention allows for the easy installation of a perfectly flush outlet box every time by simply pushing the outlet box cover along with the outlet box into the wall to have a perfectly flush fit every time.

While the above description contains many specificities, these should not be construed as limitations on the scope of the invention, but as exemplifications of the presently preferred embodiments thereof. Many other ramifications and variations are possible within the teachings of the invention. For example, the outlet box could be formed to include the retaining rails when it is molded so the metal retaining rails shown in the preferred embodiment would not be necessary. Also, the bracket could be used in any other situation where a removable and adjustable bracket is desirable. Such as, attaching the bracket to tools and the retaining rails to the wall to provide easy storage of your tools, or using the bracket and the retaining rails to slide a picture onto the wall or even an easily removable battery out of your automobile. Thus, the invention can be made in different sizes to accommodate the preferred use, or made from various different materials such as plastic or wood but not excluding any other materials. Also the linear set of teeth can be spaced at any such distance that is desired for the preferred use or removed entirely along with the flange and the bump to provide a completely slidable bracket with no limitations, or any such variation of the said parts included or excluded.

Thus the scope of the invention should be determined by the appended claims and their legal equivalents, and not by the examples given.

The invention claimed is:

1. An adjustable outlet box assembly for attachment to a wall stud comprising:
    an outlet box having a side wall and an open front face;
    a box bracket, said bracket including a stud attachment portion for fixing said bracket to said wall stud and a side wall attachment portion for slidable attachment to said side wall of said outlet box;
    said bracket including a linear set of teeth which are transversely extending and longitudinally spaced;
    said outlet box including an engagement member biasingly positioned for engagement with said linear set of teeth, said engagement member being adjustably positionable between two adjacent teeth for fixing the position of said side wall of said outlet box to said side wall attachment portion of said bracket;
    said engagement member being releasable from engagement with said linear set of teeth to permit removal of said outlet box with respect to said side wall attachment portion of sail bracket;
    said bracket includes an electrical box stop bump to prevent said outlet box from moving too far along said bracket wherein, when said side wall of said outlet box meets said electrical box stop bump further movement along wall stud is prevented.

2. An adjustable outlet box of claim 1 wherein when said side wall of said stud outlet box is slidably installed into said side wall attachment portion of the bracket movement in one direction requires no tools.

* * * * *